UNITED STATES PATENT OFFICE.

HENRI MONSEUR, OF ANGLEUR-LEZ-LIEGE, BELGIUM.

PROCESS OF PRESERVING ORGANIC MATERIALS.

1,057,076.  Specification of Letters Patent.  Patented Mar. 25, 1913.

No Drawing. Application filed October 26, 1911. Serial No. 656,900.

*To all whom it may concern:*

Be it known that I, HENRI MONSEUR, subject of the King of Belgium, residing at Angleur-lez-Liege, Belgium, have invented new and useful Improvements in Processes of Preserving Organic Materials, of which the following is a specification.

Known processes of impregnating organic materials by means of solutions of metallic compounds and notably of ammoniacal solutions, have several serious drawbacks. For instance, when solutions containing copper are brought into the presence of iron, the copper is precipitated and the oxygen and the acids which are released attack and corrode the iron. Solutions containing metallic salts have also the disadvantage of rendering the wood a good conductor of electricity. Further, when the salts composing the solutions are formed of powerful acids, such as sulfuric acid and hydrochloric acid, these are released owing to the combination of the metallic oxids with the constituents of the wood, and are forced, together with a part of the ammonia, into the center of the wood. The part of the wood in which the metallic oxid is absent is attacked by the said acids and by the nitrous acids produced by the decomposition of the ammonia. Another disadvantage of the solution of metallic salts is that, when these solutions are used for certain materials, or when they are used in relatively strong concentration, the whole of the salts, in the first case, and a part of salts in the second case, remain in a form soluble in water and are washed out of the prepared materials.

The present invention has for its object to obviate these disadvantages by adding to the ammoniacal solution of a metal, phenic acid or its equivalents which have no deleterious action on the fiber of the wood, nor on iron, render the wood a bad conductor of electricity, neutralize the nitrous and nitric acids and prevent their formation.

When the phenols are added to the ammoniacal solution of metal, they combine in an insoluble and non-volatile manner, which is very advantageous, as their powerful antiseptic action is limited by their solubility or their volatility. Phenic acid has a further advantage over the other acids, in that it permits the formation of metallic salts which are always insoluble in water after the alkali has disappeared, while in this same mixture, the other acids retain the greater part of the alkali to form metallic ammoniacal salts which are soluble in water when not combined with the vegetal material. This effect is of the greatest importance in that it produces impregnating solutions and coatings which are always insoluble in water no matter what may be the concentration of the solution. The addition of gum arabic or its equivalents also prevents oxidation by the solution and nullifies the conductivity of the metallic solutions. Oxidation may be further avoided by adding non-oxidizing acids, such as formic acid, oxalic acid, lactic acid, boric acid, etc., or by adding in suitable proportions oxidizing acids, such as hydrofluoric acid, etc., which, in the presence of the ammoniacal metallic solutions, have no corroding action on iron.

The following example will illustrate the solutions which may be used in accordance with this process:—(1) 5% Cu., $3\frac{1}{2}$% Zn., 15% $C_6H_5OH$ (phenic acid), 60% $NH_3$ (liquid ammonia 22 deg. B., $16\frac{1}{2}$% $H_2O$. (2) 5% Cu., $3\frac{1}{2}$% Zn., 5% $C_6H_5OH$, 10% $CO_2H_2$ (formic acid), 60% $NH_3$, $16\frac{1}{2}$% $H_2O$.

Among the equivalents of the carbolic acid, we understand all the acid derivatives or derivatives soluble in the ammoniates of the aromatic series having no corroding action on iron.

Having now particularly described and ascertained the nature of my said invention and in what manner the same is to be performed, I declare that what I claim is:

1. A process of preserving organic material which consists in impregnating the material in an ammoniacal solution of a metal to which has been added a non-oxidizing substance which is a non-conductor of electricity.

2. A process of preserving organic material which consists in impregnating the material in an ammoniacal solution of a metal to which has been added a non-oxidizing substance which is a non-conductor of electricity and an acid which is free from corroding action on iron.

3. A process of preserving organic material which consists in impregnating the material in an ammoniacal solution of a metal to which has been added a phenol.

In testimony whereof I have signed my name to this specification in the presence of two subscribing witnesses.

HENRI MONSEUR.

Witnesses:
 CHAS. ROY NASMITH,
 EMILE VERNMARELLI.